Dec. 10, 1968   R. L. FLEISCHER ETAL   3,415,993
RADIATION DETECTION SHEET MATERIAL HAVING METAL
COATING TO FACILITATE READ-OUT
Filed Nov. 7, 1966
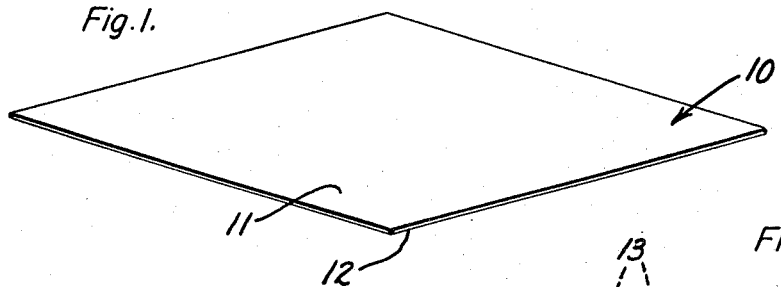
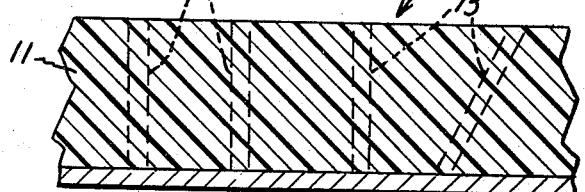
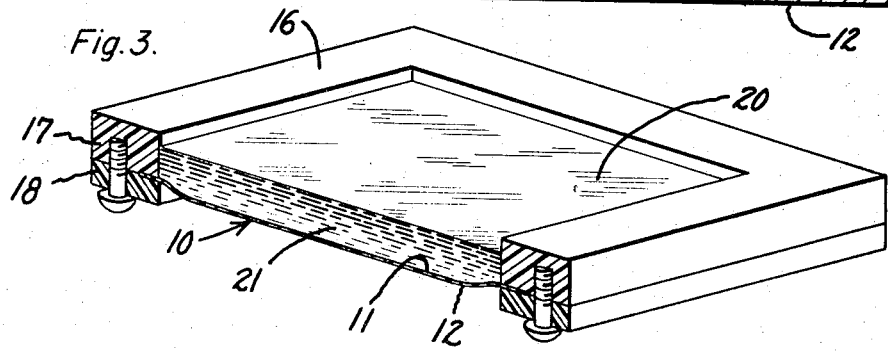
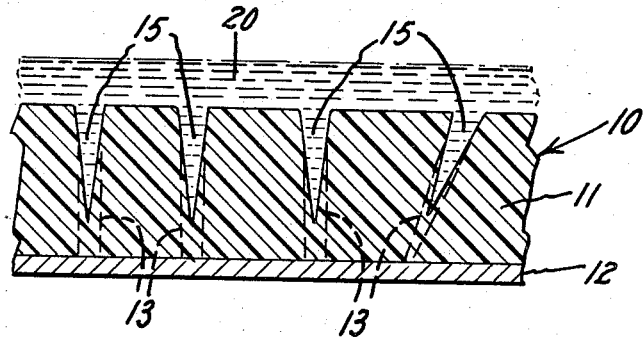
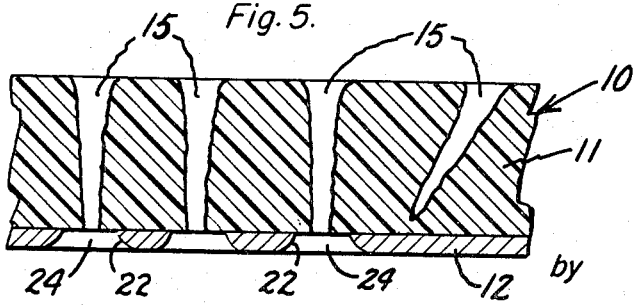
Inventors:
Robert L. Fleischer;
Robert M. Walker;
Paul B. Price,
by
Their Attorney United States Patent Office 3,415,993
Patented Dec. 10, 1968

3,415,993
RADIATION DETECTION SHEET MATERIAL
HAVING METAL COATING TO FACILITATE
READ-OUT
Robert L. Fleischer and Paul B. Price, Schenectady, N.Y.,
and Robert M. Walker, St. Louis, Mo., assignors to
General Electric Company, a corporation of New York
Filed Nov. 7, 1966, Ser. No. 592,492
3 Claims. (Cl. 250—83)

ABSTRACT OF THE DISCLOSURE

A sheet of light-transmitting material is provided on one side with a coating of aluminum so that capillary-size openings through the sheet can be made more easily visible by filling these openings with a caustic soda solution and thereby forming enlarged openings through the aluminum coating.

---

The present invention relates generally to the art of radiation detection and is more particularly concerned with versatile new articles having special utility for both the detection and measurement of radiation of widely-different types and levels of intensity, and with novel radiation measurement methods employing these articles and including a photographic method.

The pioneer radiation-etching method of forming or drilling holes through sheet materials disclosed and claimed in copending patent application Ser. No. 176,320, filed Feb. 28, 1962, and assigned to the assignee hereof, results typically in a sheet product in which the holes or apertures are not visible to the naked eye. Consequently, when this method is employed in accordance with the radiation detection and measurement invention disclosed and claimed in copending patent application Ser. No. 308,188, filed Sept. 11, 1963, and also assigned to the assignee hereof, it is not ordinarily possible to read directly and visually the results registered in the form of holes through the test sheet. In either instance, prolonged exposure of the irradiated sheet material to an appropriate etchant, as disclosed in the aforesaid patent applications, may result in enlargement of the openings through the test sheet until they become visible to the naked eye. This, however, involves delaying the read-out step and in some cases raises the problem of over-etching of the test sheet.

By virtue of the present invention, it is possible to read out with practically no difficulty or delay test results developed through the use of the methods and materials disclosed and claimed in the aforesaid patent applications. Moreover, this can be done without either significantly complicating or substantially increasing the cost of the basic radiation-etching method of detecting or measuring radiation, and also without reducing the sensitivity of that method or limiting its versatility.

A basic concept of this invention is the use of a mask which can be removed at a substantially greater rate than the damage "track"-defining material of the test sheet. Thus, in a preferred form, this invention involves the use of a metal film on one side of a plastic test sheet, the metal suitably being one which is dissolved and removed by the damage track etchant employed in chemically drilling holes through the radiated sheet. The holes formed in the metal film by etchant reaching the film through the holes formed in the test sheet by the etchant are of considerably greater diameter or cross-sectional dimension than the holes in the sheet and are easily seen.

Another important concept underlying this invention is the idea of using an etched, masked test sheet as a photographic negative. If the test piece is of transparent material such as an organic polymeric body of thickness permitting light transmission in the visible range, and if the mask is opaque, good black and white contrast between irradiated and unirradiated regions of the test sheet can be obtained in a photographic print.

Briefly described, the radiation detection and measurement article of this invention consists in its simplest form of a thin sheet or radiation damage track-forming material and a thin coat of metal covering either the top or the bottom surface of this sheet material. Thus, one surface is left uncovered so that radiation particles to be measured and detected can penetrate the sheet and travel all the way through it to produce the damage tracks subsequently to be etched and removed to form holes through the sheet. Preferably, the sheet material will be an organic polymeric material and the mask will be a metal film and the sheet and mask will be of approximately the same thickness with the mask in any event being in original form substantially free from holes or openings. Suitably, the mask will be about 1 micron thick and the sheet will be about 10 microns thick, the maximum thickness of the sheet being dictated by the limit of penetration of the radiation particles to be detected or measured because these have to go all the way through the sheet for reliable read-out.

It follows that the present invention also contemplates as a novel article the "developed" test article described above, that is, the radiated and etched body having straight-through openings running from one side to the other of the sheet and openings in register with them in the opaque mask or backing, the latter being of substantially greater cross-sectional dimension than the openings through the sheet.

In its method aspect, this invention in general terms comprises the steps of exposing one side of a test sheet of radiation damage track-forming material to a source of radiation to be detected or measured and thereby producing damage tracks running through the sheet from one side surface to the other. Another step of this method involves dissolving and removing from the sheet over the full length of the tracks a portion of the material defining those tracks. Another step of this method involves marking the location of the resulting openings through one side of the sheet by forming enlarged openings in an opaque mask on the sheet in register with the openings through the sheet. Preferably, this method will include as a preliminary step the deposition of a film of metal as the mask on one side of the sheet, but it will be understood that this film deposition step may be carried out after the irradiation step or even after the sheet has been etched. In the latter case, a second etching step will be carried out to produce the enlarged openings through the metal film or mask by which the smaller cross-sectional dimension openings through the test sheet material can easily be located visually.

As indicated above, this invention also contemplates as one of its method aspects a photographic process which, in brief, includes the steps of the method defined just above and, in addition, involves the use of the resulting apertured metal-coated test article as a photographic negative through which a photosensitive composition is exposed to a source of light. The final step to this method is the development of the resulting photographic print.

With reference to the drawings accompanying and forming a part of this specification:

FIG. 1 is a perspective view of a radiation detection and measurement article of this invention consisting of a thin sheet of plastic material coated with a thin film of aluminum;

FIG. 2 is a fragmentary, enlarged, cross-sectional view of the article of FIG. 1, indicating radiation particle damage tracks in the plastic sheet;

FIG. 3 is a perspective view of apparatus in use in carrying out the etching step of the method of this invention, a portion of the apparatus being removed for clarity;

FIG. 4 is a fragmentary, enlarged, cross-sectional view of the irradiated and partially-etched test article of FIGS. 1 and 2, showing the process illustrated in FIG. 3 at an intermediate stage; and FIG. 5 is a fragmentary, cross-sectional view of the product resulting from the process of FIG. 3 carried out on the article of FIGS. 1 and 2.

As shown in the drawings, test article 10, except for localized effects of the radiation-etching method, remains essentially unchanged during use in accordance with this invention. Thus, neither radiation nor etching in the usual case produces or results in any apparent change in either plastic sheet 11 or in metal film 12 except for the apertures opened along radiation damage track sites 13. Depending upon the material of the test sheet and the etchant employed, and also depending upon the length of the etching period and the strength and temperature of the etchant, there may be some loss of the test sheet because of dissolving action occurring principally at the top or uncovered surface of the sheet. This attack, however, will normally proceed at a much slower rate than that on the damage track material so that by the time the sheet and mask have been apertured, the loss of sheet material at other than damage track sites will be slight to moderate and acceptable.

In carrying out this present process, the radiation to be detected, measured or monitored is permitted to impinge upon test article 10 disposed in a personnel badge or otherwise suitably supported in the radiation environment as disclosed and claimed in aforesaid copending patent application Ser. No. 308,188, the entire disclosure of which is incorporated herein by reference. Article 10 then is mounted in an etching frame 16 comprising an upper rectangular body 17 and a lower rectangular body 18 of the same general dimensions fastened together with the edges of article 10 gripped securely between them to provide a generally rectangular open chamber 20 open at its top. Chamber 20 is then partially filled with an etchant solution 21, whereupon the dissolving action is immediately begun on damage track sites 13. Depending upon the particular etchant employed and its temperature and strength, this dissolving action will proceed at a greater or lesser rate. Since all the radiation particles normally will not have entered the test sheet at right angles to the top surface of the sheet, the etching action will be completed at differing times along different damage track lines. Consequently, as indicated in FIG. 5, this etching and dissolving operation may be terminated before all the damage track-defining material in the sheet has been removed. As the etching action proceeds, the attack will be substantially slowed or arrested when the etchant reaches the periphery of the damage track-defining material in each bore 15. Also, there will usually be a certain slight taper to bores 15 (one to three degrees), much exaggerated in FIGS. 4 and 5, at the intermediate and terminal stages of the etching operation.

When the etchant solution reaches the coated side of the sheet 11 and the etchant comes into contact with metal film 12, the etchant rapidly attacks the metal film, dissolving and removing the film until film edges 22 define enlarged openings 24 at the entrance to each bore 15, as illustrated in FIG. 5. As edges 22 are being cut back by the etchant, some etchant solution will run through these bores 15 and openings 24 and be lost from chamber 20; but because of the capillary-like dimensions of bores 15, this will normally amount to only a small part of the etchant volume.

When the etching operation has proceeded to the extent indicated in FIG. 5, the operation will be terminated, body 20 being drawn off and test sheet article 10 being rinsed with water to arrest the attack of the etchant upon sheet 11 and metal coating 12.

Those skilled in the art will gain a further and better understanding of this invention from the following illustrative, but not limiting, examples of the invention as we have carried it out in actual practice:

EXAMPLE I

Using a 10-micron sheet 10 of commercial polycarbonate resin (U.S. Patents 2,946,766 and 2,950,266), we deposited by an evaporation technique an opaque film of aluminum on one side of sheet 11. This evaporation and deposition operation was carried out in the conventional manner, an aluminum wire being vaporized in a vacuum of $10^{-5}$ mm. Hg by an electric power pulse and the resulting metal vapor being condensed on the exposed under surface of sheet 11 in the vacuum chamber, the chamber and sheet 11 being at room temperature during the operation. The resulting aluminum film 12, approximately 1 micron thick, was substantially uniform in thickness and had a smooth, hole-free surface. This coated test article 10 was then exposed to the Californium source described in aforesaid application Ser. No. 308,188. After exposure in this manner for 10 minutes, the test article was removed from its holder and mounted in the apparatus of FIGS. 3 and 5 N NaOH at 50° C. and was poured in on the uncoated surface of test sheet 11. After one hour, the caustic soda solution was removed and the test sheet was rinsed with water, dried in air and finally removed from etching frame 16 and visually examined with the unaided eye. Fission fragment track bores 13 in sheet 11 were easily located because of the relatively large openings 24 (diameter about 0.1 mm.) through aluminum film 11. Bores 15 were not visible to the naked eye, being of diameter less than about $10^{-3}$ mm.

EXAMPLE II

In another operation like that of Example I, a sheet of polyethylene glycol terephthalate of uniform thickness of about 15 microns was substituted for the polycarbonate resin sheet. This sheet material was likewise coated with aluminum to a uniform thickness of about 20 microns and this coated test article was also subjected to exposure to fragments of spontaneous fission of Cf–252 for 10 minutes. The radiated test article was then removed from its supporting structure and immersed in aqueous potassium hydroxide of 1.4 specific gravity. The etching solution was 80° C. and the etching period was only 10 minutes. Then the article was water-rinsed and examined for porosity and found to be easily read by the unaided eye as to radiation exposure, the comparatively large diameter openings (about 0.1 mm.) in the aluminum coating being readily visible.

EXAMPLE III

The final product of Example I was used as a negative in a photographic operation resulting in a black and white print of sharp contrast. Thus, conventional photographic paper was exposed through the aperture article of Example I and then developed in conventional manner with the result that the openings through the aluminum film showed up clearly to the full extent of their cross-sectional size, light being transmitted effectively through the resin sheet and being blocked in the areas coated by the aluminum film.

EXAMPLE IV

In still another operation like that of Example I, the resin sheet was irradiated and etched as described and then was provided with an aluminum coating approximately 1 micron thick. Thereafter the aluminum was chemically drilled through at each track bore site through the use of a 5 N NaOH solution to produce the enlarged diameter openings necessary to easy visual read-out of the radiation exposure of the sheet. In this case all the damage tracks were developed, instead of only those that were shortest, since it was possible to permit the etching period to extend well beyond the time that the straight-through bores were completed, there being no time interval between the metal etching events at the various bore sites.

EXAMPLE V

In still another operation like that of Example I, a sheet of collulose nitrate was used for the detection and measurement of particle radiation from a Po-210 source. The cellulose nitrate sheet was provided with an aluminum coating as described in Example I and the sheet and mask were of the thicknesses there stated. The exposure period was one hour after which the irradiated aluminum-coated sheet was contacted with a 6 N NaOH solution at 23° C. in the manner described above. Then following a water rinsing step to remove adhering etchant solution, the apertured article was examined and as in the foregoing examples the openings through the aluminum mask or coating were found to be easily visible to the naked eye so that read-out of the α-radiation test results was facilitated.

As indicated above, the materials contemplated for use in accordance with this invention are those disclosed and claimed in the aforesaid copending patent applications Ser. Nos. 308,188 and 176,320, and in copending application Ser. No. 368,520, filed May 19, 1964, and also assigned to the assignee hereof. The entire disclosures of all these applications are incorporated herein by reference.

Having thus described this invention in such full, clear, concise and exact terms as to enable any person skilled in the art to which it apertains to make and use the same, and having set forth the best mode contemplated of carrying out this invention, we state that the subject matter which we regard as being our invention is particularly pointed out and distinctly claimed in what is claimed, it being understood that equivalents or modifications of, or substitutions for, part of the specifically-described embodiments of the invention may be made without departing from the scope of the invention as set forth in what is claimed.

What we claim as new and desire to secure by Letters Patent of the United States is:

1. A radiation detection and measurement article comprising a sheet of an organic polymeric material and a metal coating on one side of the said sheet, said sheet having a plurality of straight-through openings running from one side to the other of the sheet and being of substantially uniform cross-sectional size, and said metal coating having apertures in register with the openings through the sheet of cross-sectional size substantially greater than that of the openings through the sheet whereby visual observation of the openings through the sheet is facilitated.

2. A radiation detection and measurement article comprising a thin sheet of a bisphenol acetate carbonate copolymer having a top surface to be exposed to damage "track"-producing radiation, and a thin coat of aluminum covering a substantial portion of the bottom surface of the polymer sheet.

3. A radiation detection and measurement article comprising a sheet of radiation damage "track"-defining material of substantially uniform thickness approximating one micron and having a top surface to be exposed to damage "track"-producing radiation, and a coat of metal of substantially uniform thickness approximating one micron covering a substantial portion of the bottom surface of the said sheet.

References Cited
UNITED STATES PATENTS 3,335,278   8/1967   Price et al. _____ 250—83.1

RALPH G. NILSON, *Primary Examiner.*

M. J. FROME, *Assistant Examiner.*

U.S. Cl. X.R.

250—83.1; 156—2